UNITED STATES PATENT OFFICE.

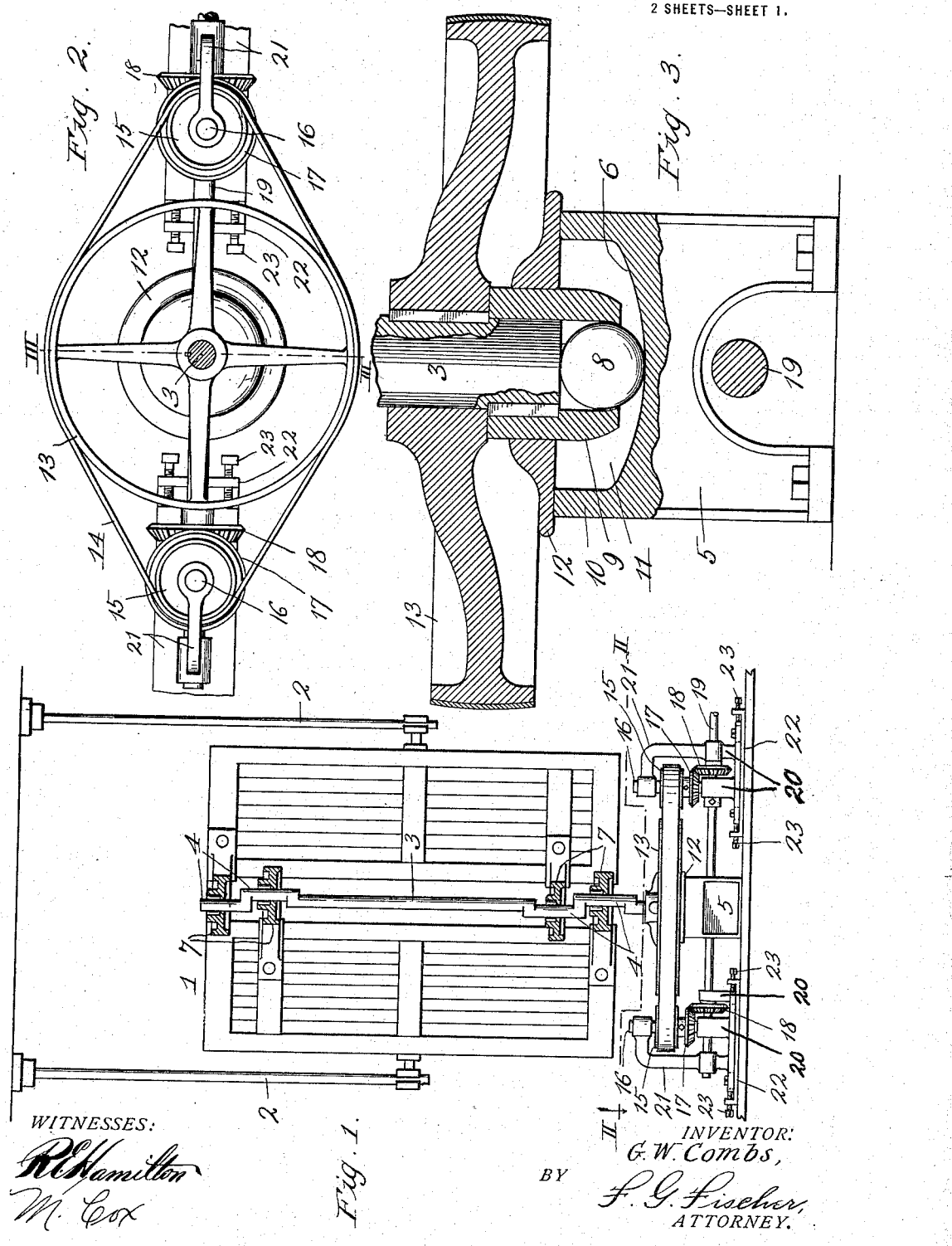

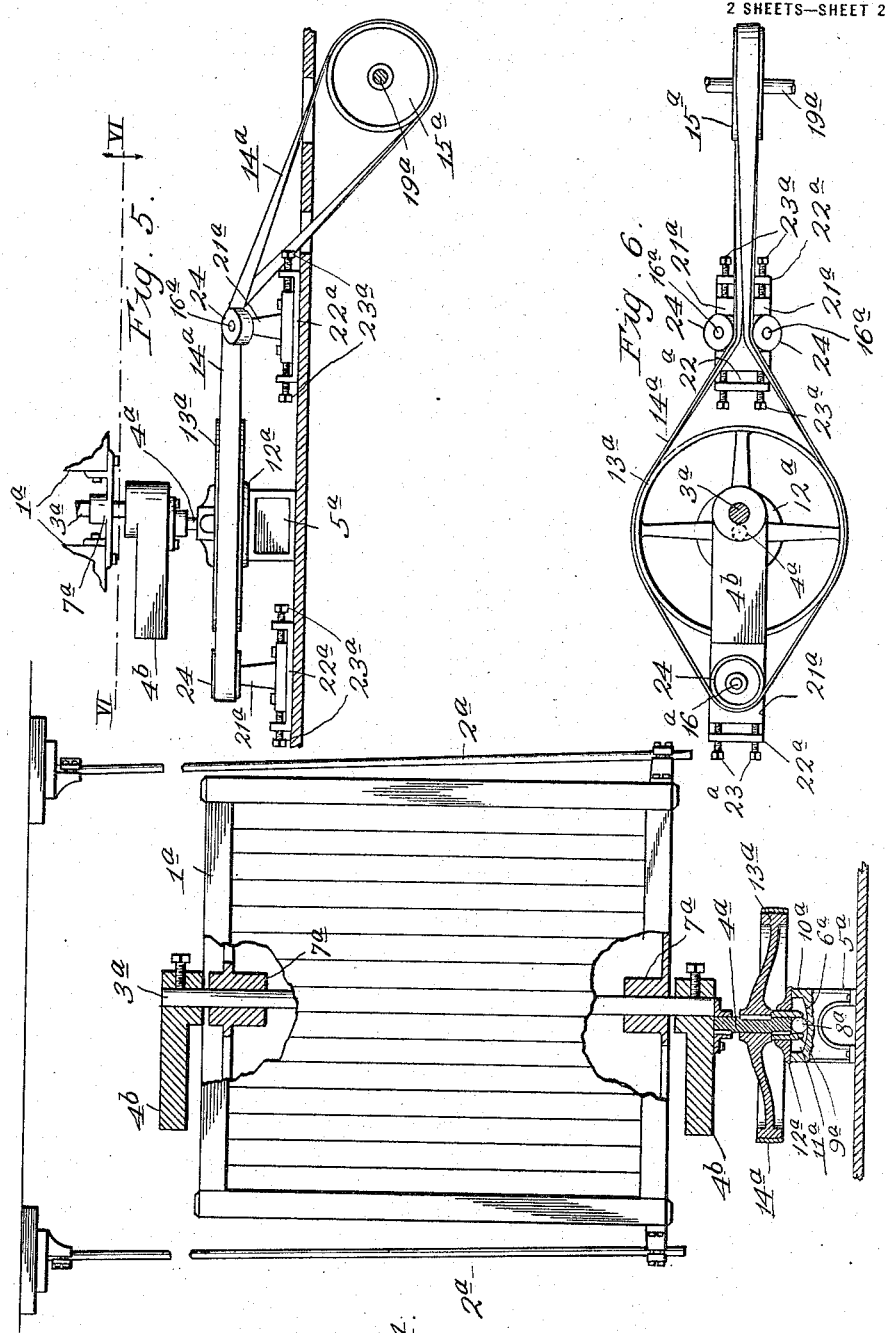

GEORGE W. COMBS, OF LEAVENWORTH, KANSAS.

GYRATORY STRUCTURE.

1,192,498. Specification of Letters Patent. Patented July 25, 1916.

Application filed August 18, 1908. Serial No. 449,077.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

This invention relates to improvements in gyratory structures, such as flour sifters, etc., and my object is to overcome excessive throw of the structure. This excessive throw in flour sifters usually occurs before the sifter attains critical speed. It also occurs when one of the sieve boxes becomes overloaded with stock and over-balances its companion, and when the sifter has a rigid connection with the building, as through its drive-shaft and a stationary bearing considerable strain is imposed upon the building whenever the sifter leaves its true gyratory course.

I relieve the building of abnormal strain and overcome abnormal throw of the structure by driving the same with a combination driving and restraining means.

In order that the invention may be fully understood, reference will now be made to the accompanying drawings in which, Figure 1 represents a vertical section of a gyratory structure, provided with my improvements. Fig. 2 is a horizontal section on line II—II of Fig. 1. Fig. 3 is a horizontal section on line III—III of Fig. 2. Fig. 4 is a side elevation, partly in section, of a modified form of the invention. Fig. 5 is a side elevation of the modified form of the combination driving and restraining means. Fig. 6 is a horizontal section on line VI—VI of Fig. 5.

1 designates the structure which is freely supported from the ceiling of the building by flexible rods 2 and provided with a centrally-disposed vertically-positioned shaft 3 which is provided with means, consisting preferably of cranks 4, for imparting a gyratory movement to the structure.

5 designates a step-bearing provided with a concave seat 6 for supporting shaft 3 which has slight vertical movement in the structure bearings 7, so that said shaft may move up and down on the concave seat.

8 designates a ball interposed between the end of shaft 3 and seat 6 to reduce the friction to a minimum, said ball being held in position beneath the lower terminal of the shaft by a sleeve 9, see Fig. 3. Bearing 5 is preferably secured to the floor of the building and is provided with an upwardly extending wall 10 forming a lubricant chamber 11, for ball 8 to operate in, said lubricant chamber 11 being closed by cap 12, loosely embracing sleeve 9.

13 designates a rotary member, preferably in the form of a pulley, which is fixed to the lower portion of shaft 3. That portion of the shaft upon which the pulley is mounted is in line with the main axis of the shaft and constitutes the center of rotation thereof.

14 designates an endless belt for driving pulley 13 and restraining the structure from abnormal throw. Said belt is driven by two diametrically-opposed stationary drivers 15, fixed upon a pair of counter-shafts 16, provided with bevel gear wheels 17, intermeshing with a pair of bevel gear wheels 18, fixed upon a drive-shaft 19, which extends through the bifurcated lower portion of the step-bearing 5. Bevel gear wheels 18 are slidably mounted on shaft 19, so that said wheels may be shifted longitudinally upon the shaft to retain them in mesh with gear wheels 17, when the latter are adjusted laterally, as hereinafter described. Bevel wheels 18 have the customary groove and feather connection (not shown) with shaft 19 so they will be rotated by the latter. Countershafts 16 and shaft 19 are journaled in bearings 21, adjustably mounted upon a pair of bases 22, provided with screws 23 for engaging and adjusting bearings 21 laterally upon the bases. By adjusting bearings 21 laterally together with drivers 15, belt 14 may be tensioned as desired and thus perform its function of not only driving pulley 13, but also restraining the structure from abnormal throw. When bearings 21, together with the parts they carry, are adjusted laterally, bevel wheels 18 are adjusted therewith by the upwardly extending members 20 to retain them in mesh with the bevel gears 17.

Referring now to the modified form shown in Figs. 4, 5 and 6: 1ª designates the structure, 2ª the flexible rods, whereby it is suspended, and 3ª a vertically-positioned shaft which is journaled in centrally-disposed bearings 7ª on the structure. Said shaft is provided with a crank-pin 4ª and two eccentric weights 4ᵇ, whereby a gyratory motion is imparted to the structure. Crank-pin 4ª is mounted on the concave seat 6ª of a step-bearing 5ª, a ball 8ª being interposed between the crank-pin and the concave seat to reduce the friction to a minimum. Ball 8ª is held in position by a sleeve 9ª, secured to the lower terminal of the crank-pin 4ª. Bearing 5ª has an upwardly extending wall 10ª forming a lubricant chamber 11ª which is closed by a cap 12ª, loosely embracing the sleeve. Crank-pin 4ª is provided with a pulley 13ª, which is driven by an endless belt 14ª, extending around idlers 24 and a stationary-driver 15ª, which latter is mounted upon a drive-shaft 19ª. Idlers 24 are mounted upon counter-shafts 16ª, mounted in bearings 21ª, slidably mounted upon bases 22ª whereby bearings 21ª are adjusted laterally. By thus adjusting the bearings, belt 14ª may be tensioned as desired.

Having thus described my invention, what I claim is:

1. In combination, a body, a vertically-positioned shaft mounted therein, a stationary support for said shaft independent of the body, antifriction means interposed between the shaft and said support, and endless flexible restraining means for steadying said shaft.

2. In combination, a gyratory structure, a shaft thereto, a pulley fixed to said shaft, and flexible means for driving said pulley and restraining abnormal throw of the structure.

3. In combination, a freely-supported structure, means for preventing rotation thereof, a pulley for the structure, and a flexible member for driving said pulley and restraining abnormal throw of the structure.

4. In combination, a gyratory structure, a shaft therefor, a support for said shaft independent of the structure, a pulley fixed to said shaft, and an endless flexible member for driving said pulley and restraining abnormal throw of the structure.

5. In combination, a gyratory structure, a shaft thereto, a member fixed to said shaft, endless means for driving said member and restraining abnormal throw of the structure, and one or more stationary drivers for driving the endless member.

6. In combination, a gyratory structure, a shaft thereto, a member fixed to said shaft, endless means for driving said member and restraining abnormal throw of the structure, and one or more adjustably mounted drivers for tensioning and driving the endless member.

7. In combination, a gyratory structure, a shaft thereto, a member fixed to said shaft, endless means for driving said member and restraining abnormal throw of the structure, one or more stationary drivers for driving the endless member, and gearing for driving said driver or drivers.

8. In combination, a gyratory structure, a shaft thereto, a member fixed to said shaft, endless means for driving said member and restraining abnormal throw of the structure, one or more adjustably mounted drivers for tensioning and driving the endless member, and adjustable gearing for driving said driver or drivers.

9. In combination, a gyratory structure, a shaft loosely mounted therein, a support for the shaft independent of the structure, a pulley fixed to said shaft, an endless belt for driving said pulley and restraining abnormal throw of the structure, diametrically-opposed drivers for driving said belt, and bevel gearing for actuating said drivers.

10. In combination, a gyratory structure, a shaft thereto, a member fixed to said shaft, an endless member for driving said member and restraining the structure from abnormal throw, a pair of diametrically-opposed drivers for driving said endless members, and gearing for actuating said drivers.

11. In combination, a gyratory structure, a shaft thereto, a member fixed to said shaft, an endless member for driving said rotary member and restraining the structure from abnormal throw, a pair of diametrically-opposed drivers for driving said endless member, counter-shafts on which said drivers are fixed, bevel gears also fixed to said counter-shafts, a drive shaft, bevel gears adjustably mounted thereon and intermeshing with the first-mentioned bevel gears, a pair of bases, and two sets of bearings for the shafts, each set of bearings being adjustably mounted on a base.

12. The combination of a normally-gyratable structure, and endless restraining means for steadying said structure.

13. The combination of a normally-gyratable structure, endless restraining means for steadying said structure, and means independent of the structure for supporting said restraining means.

14. The combination of a gyratory structure, yielding supports therefor, endless restraining means for steadying the structure, and additional supports for said restraining means.

15. The combination of a gyratory structure, a shaft extending through the same, a pulley on said shaft, and independently-supported endless restraining means engaging said pulley to steady the structure.

16. The combination of a normally-gyratable structure, and endless flexible restraining means for steadying said structure.

17. The combination of a normally-gyratable structure, and an independently-supported endless belt for steadying said structure.

18. The combination of a structure, means for gyrating the same, a pulley for said structure, and an independently-supported endless device traveling around said pulley to steady the structure.

19. The combination of a normally-gyratable structure, endless restraining means for steadying said structure, and independent means for supporting and tensioning said restraining means.

20. The combination of a freely-supported structure, a shaft for imparting motion thereto and capable of gyratory motion, a step-bearing for supporting the shaft, a flexible member independent of said step-bearing for steadying said shaft, and means independent of the structure for supporting said flexible member.

21. The combination of a normally-gyratable structure, means freely-supporting the same, a shaft for said structure, two diametrically-opposed drivers adjacent said shaft, and flexible means connecting the drivers and said shaft for driving the latter.

22. In combination, a gyratory structure having centrally-disposed bearings, a shaft journaled in said bearings for imparting motion to the structure, a pulley fixed to the lower end of the shaft, two stationary drivers adjacent said pulley, and an endless member connecting the pulley and said drivers.

23. In combination, a gyratory structure, a crank-shaft journaled therein, a pulley fixed to said shaft in line with the major axis thereof, two stationary drivers at opposite sides of said pulley, and an endless member connecting the pulley and said drivers.

24. In combination, a gyratory structure, a shaft thereto, and an element constituting both driving and restraining means for driving said shaft and restraining abnormal throw of the structure.

25. In combination, a body, freely supported, a vertically positioned shaft mounted thereon, and an element constituting both driving and restraining means for driving said shaft and restraining the body from abnormal throw.

26. In combination, a gyratory structure having a centrally disposed bearing, a shaft mounted on said bearing, and an element constituting both driving and restraining means whereby the shaft is driven and the structure is restrained from abnormal throw.

27. In combination, a gyratory structure a shaft thereto, a support for said shaft independent of the structure, and an element constituting both driving and restraining means for driving said shaft and restraining abnormal throw of the structure.

28. In combination, a body, a vertically positioned shaft mounted thereon, a stationary support for said shaft independent of the body, and an element constituting both driving and restraining means for driving said shaft and restraining abnormal throw of the body.

29. In combination, a freely supported body, a shaft thereto, a support for said shaft independent of the body, an element constituting both driving and restraining means for driving said shaft and restraining abnormal throw of the structure, and a stationary driver independent of the body for driving said means.

30. In combination, a suspended structure, a shaft mounted thereon and provided with means for imparting a gyratory motion to said structure, and an element constituting both driving and restraining means whereby the shaft is driven and the structure is restrained from abnormal throw.

31. In combination, a structure freely supported for gyration, a crank-shaft thereto free to move laterally in any direction, a pulley mounted on a portion of said shaft in line with the main axis thereof, and means for driving said pulley.

32. In combination, a gyratory body, a shaft therefor, a pulley fixed to said shaft, a stationary support for said shaft independent of the pulley, and endless means for driving the pulley and tending to restrain the body from abnormal gyration.

33. In combination, a gyratory structure, a shaft therefor provided with means for imparting gyratory motion to the structure, and endless flexible means for driving said shaft and tending to restrain the structure from abnormal gyration.

34. In combination, a gyratory structure, a shaft centrally journaled therein, a support for said shaft having an upwardly-extending wall forming a lubricant chamber, and endless means for driving the shaft and tending to restrain the structure from abnormal gyration.

35. In combination, a gyratory structure, a shaft mounted therein, and endless flexible means for driving said shaft and tending to restrain the structure from abnormal gyration.

36. In combination, a gyratory body, a shaft thereto, a support for said shaft independent of the body, a pulley fixed to said shaft, an endless restraining member engaging said pulley to drive the same and restrain the body from abnormal throw, and means for driving said endless restraining member.

In testimony whereof I affix my signature in the presence of two witnesses.

GEORGE W. COMBS.

Witnesses:
SIGURD ANDERSON,
G. D. OBERSCHELP.

Copies of this patent may be obtained for five cents each, by addressing the "Commissioner of Patents, Washington, D. C."